No. 846,727. PATENTED MAR. 12, 1907.
L. BURG.
BALL BEARING.
APPLICATION FILED DEC. 6, 1906.
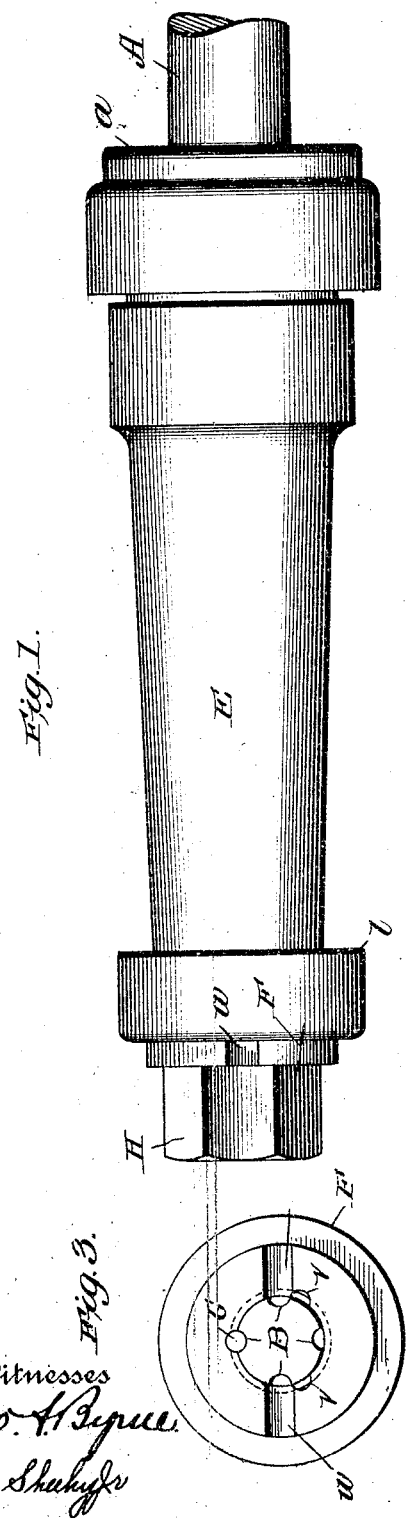
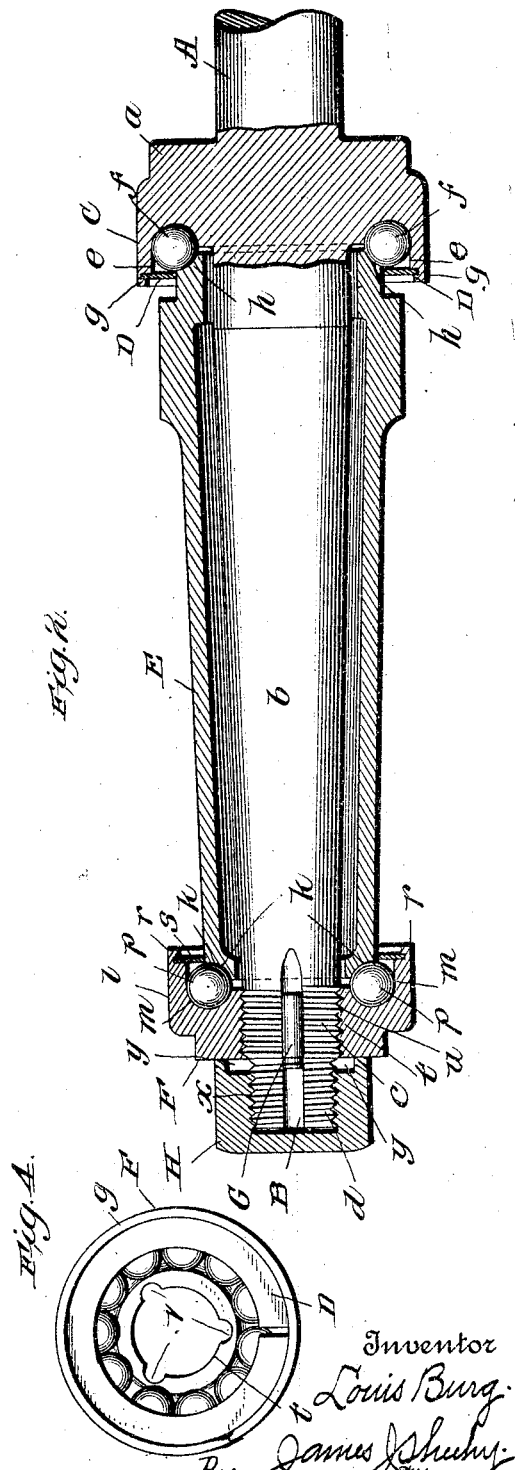

UNITED STATES PATENT OFFICE.

LOUIS BURG, OF DALLAS CITY, ILLINOIS.

BALL-BEARING.

No. 846,727.   Specification of Letters Patent.   Patented March 12, 1907.

Application filed December 6, 1906. Serial No. 346,583.

*To all whom it may concern:*

Be it known that I, LOUIS BURG, a citizen of the United States, residing at Dallas City, in the county of Hancock and State of Illinois, have invented new and useful Improvements in Ball-Bearings for Vehicle-Wheels, of which the following is a specification.

My invention relates to ball-bearings for vehicle-wheels; and it has for its object to provide a ball-bearing of the kind stated in which frictional wear of the parts is practically eliminated and one embodying simple, strong, and durable means for precluding casual movement of any of the parts with respect to the others and the consequent locking of the box to the spindle.

Other objects of the invention will be fully understood from the following description and claims when the same are read in connection with the accompanying drawings, forming part of this specification, in which—

Figure 1 is a side elevation of the ball-bearing constituting the present and preferred embodiment of my invention. Fig. 2 is a longitudinal section of the same with the axle-spindle in elevation. Fig. 3 is an elevation of the outer end of the bearing, the same being shown with the cap-nut removed. Fig. 4 is an elevation of the inner side of the combined nut and cup comprised in the bearing.

Similar letters designate corresponding parts in all the views of the drawings, referring to which—

A is the axle of my improvements. The said axle is provided with the usual collar $a$, and it is also provided with a tapered spindle $b$, which terminates at its outer end in a portion $c$, threaded in one direction, which portion $c$ terminates in turn in a reduced portion $d$, threaded in the opposite direction, as shown in Fig. 2. Formed in and extending longitudinally of the said threaded portions $c$ and $d$ of the spindle $b$ are four equidistant grooves B, designed to serve a purpose hereinafter pointed out in detail.

C is a cup surrounding and fixed to the axle-collar $a$ and extending outward beyond said collar about the proportional distance illustrated. The said cup C is provided with an interior groove $e$, designed to form a race for a circular series of antifriction-balls $f$, and it is also provided at its outer edge with a shallow flange $g$, within which is arranged a split ring D. This split ring D has for its function to retain the balls $f$ in the cup C, so as to remove the liability of any of the balls being lost when the axle-box, presently described, is removed from the spindle $b$.

E is the axle-box of the bearing. This box is removably arranged on the spindle $b$ and loosely surrounds the same, so that clearance is afforded between the two, and it is provided at its inner end with a circular channel $h$ to bear against the balls $f$ in cup C and is also provided at its outer end with a circular channel $k$, designed to bear against the outer antifriction-balls of the bearing in the manner hereinafter set forth.

F is the removable combined cup and nut of the bearing. This combined device comprises a circular portion $l$, which has an interior groove $m$ to receive antifriction-balls $p$, and also has a flange $r$ at its inner edge, within which is retained a split ring $s$ for retaining the balls $p$ in the cup portion, and a nut portion $t$, which is interiorly threaded, as indicated by $u$, to engage the threaded portion $c$ of spindle $b$, and is provided with three equidistant longitudinal grooves $v$, which interrupt the said thread $u$, and is also provided in its outer side or face with diametrically opposite grooves $w$, the latter being designed for the engagement of a spanner or the like employed in turning the combined cup and nut on and off the threaded portion of the spindle $b$.

G is a removable key comprised in the bearing, and H is the cap-nut of the bearing, which cap-nut is interiorly threaded, as indicated by $x$, to engage the reduced and threaded end portion $d$ of the spindle and is provided at the inner end of the thread with an interior enlargement or space $y$ to receive the outer end of the key G, so as to prevent the said key from interfering with rotation of the cap-nut when the same is turned on or off the spindle portion $d$. The key G is designed to be removably placed in one of the grooves B of the axle-spindle $b$ and the particular groove $b$ of the combined cup and nut F, registered with said groove B, and its function is to lock the combined cup and nut to the spindle $b$ and in that way preclude casual movement of the combined cup and nut on the spindle, which would be liable to lock the box E to the spindle and cause injury to the bearing as a whole. In this connection it will be noticed that the provision of the four longitudinal grooves B leaves ample surface for the formation of the threads $c$ and $d$ and that the combination of the three equidistant grooves $v$ in the combined cup and nut F with the four equidistant grooves B in the spindle admits of the operator making 1/192 inch adjustment when sixteen threads to the inch are employed without impairing the strength of the spindle and the combined cup and nut, and this notwithstanding the fact that the key preferably employed is three-sixteenths of an inch in diameter.

In the practical use of my improvements the box E is arranged on the spindle b and so that the channel h at its inner end bears against the inner balls f, after which the combined cup and nut F is turned on the threaded portion c of the spindle until its balls p bear against the channel k at the outer end of the box E. The key G is then shoved home in opposed longitudinal grooves of the spindle and combined cup and nut, after which the cap-nut H is turned up on the reduced and threaded end portion d of the spindle b until its inner end abuts against the face of the combined cup and nut. With this done it will be apparent that casual movement of the combined cup and nut F on the spindle is precluded, and hence there is no liability of said combined cup and nut becoming casually set against the box E and in that way locking the said box to the spindle; but it will also be apparent that when it is desired to remove the box E and the wheel in which the same is arranged from the spindle b the same may be quickly and easily accomplished after the cap-nut H, the key G, and the combined cup and nut F are removed from the spindle in the order named.

It will be gathered from the foregoing that when my novel ball-bearing is in use the box E bears against the inner and outer antifriction-balls alone, with the result that there is absolutely no frictional wear between the box and the spindle or between the box and the inner cup and the outer combined cup and nut, all of which contributes to the strength of the bearing and materially prolongs the usefulness of the same.

Having described my invention, what I claim, and desire to secure by Letters Patent, is—

1. The combination in a ball-bearing for vehicle-wheels, of an axle-spindle having a portion adjacent to its outer end on which is a thread extending in one direction, and a reduced portion at its outer end on which is a thread extending in the opposite direction, and also having longitudinal grooves in the said threaded portions, a box arranged on the spindle, a combined cup and nut having a threaded bore to receive the inner threaded portion of the spindle, and also having a longitudinal groove in the wall of said bore, antifriction-balls carried by the combined cup and nut and arranged to bear against the outer end of the box, a key removably arranged in grooves of the spindle and combined cup and nut, and a nut turned on the reduced and threaded end of the spindle and arranged to retain the key in position.

2. The combination in a ball-bearing for vehicle-wheels, of a box, an axle-spindle extending through the box and having a portion adjacent to its outer end on which is a thread extending in one direction, and a reduced portion at its outer end on which is a thread extending in the opposite direction, and also having longitudinal grooves in the said threaded portions, a cup carried on the inner portion of the spindle, antifriction-balls contained in said cup and bearing against the inner end of the box, a combined cup and nut having a threaded bore to receive the inner threaded portion of the spindle, and also having longitudinal grooves in the wall of said bore, antifriction-balls carried by the combined cup and nut and arranged to bear against the outer end of the box, a key removably arranged in registered grooves of the spindle and combined cup and nut, and a cap-nut turned on the reduced and threaded end of the spindle and having a circular space in its inner end for the purpose set forth.

3. The combination in a ball-bearing for vehicle-wheels, of an axle-spindle having a portion adjacent to its outer end on which is a thread extending in one direction, and a reduced portion at its outer end on which is a thread extending in the opposite direction, and also having longitudinal grooves in the said threaded portions, a box removably arranged on the spindle, a combined cup and nut having a threaded bore to receive the inner threaded portion of the spindle, and also having a longitudinal groove in the wall of said bore, antifriction-balls carried by the combined cup and nut and arranged to bear against the outer end of the box, a key removably arranged in the grooves of the spindle and combined cup and nut, and a cap-nut turned on the reduced and threaded end of the spindle and having an enlarged circular space in its inner end for the purpose set forth.

4. The combination in a bearing for vehicle-wheels, of an axle-spindle having a portion adjacent to its outer end on which is a thread extending in one direction, and a reduced portion at its outer end on which is a thread extending in the opposite direction, and also having longitudinal grooves in the said threaded portions, a box removably arranged on the spindle, a box-retaining device having a threaded bore to receive the inner threaded portion of the spindle and also having one or more longitudinal grooves in the wall of said bore, a key removably arranged in registered grooves of the spindle and box-retaining device, and a suitable nut turned on the reduced and threaded end of the spindle.

5. The combination of an axle-spindle provided with a threaded portion, an interiorly-threaded nut mounted on the spindle, there being three equidistant, longitudinal grooves formed in the one, four equidistant longitudinal grooves formed in the other, and a key removably arranged in registered grooves of the spindle and nut.

In testimony whereof I have hereunto set my hand in presence of two subscribing witnesses.

LOUIS BURG.

Witnesses:
 CHAS. S. SHIPMAN,
 W. H. BLISS.